(12) United States Patent
Baek

(10) Patent No.: US 9,803,729 B2
(45) Date of Patent: Oct. 31, 2017

(54) CONTINUOUSLY VARIABLE TRANSMISSION

(71) Applicant: Young Gu Baek, Gyeongsangbuk-do (KR)

(72) Inventor: Young Gu Baek, Gyeongsangbuk-do (KR)

( * ) Notice: Subject to any disclaimer, the term of this patent is extended or adjusted under 35 U.S.C. 154(b) by 0 days.

(21) Appl. No.: 15/303,160

(22) PCT Filed: Mar. 27, 2015

(86) PCT No.: PCT/KR2015/003052
§ 371 (c)(1),
(2) Date: Feb. 6, 2017

(87) PCT Pub. No.: WO2015/156524
PCT Pub. Date: Oct. 15, 2015

(65) Prior Publication Data
US 2017/0248206 A1    Aug. 31, 2017

(30) Foreign Application Priority Data

Apr. 10, 2014 (KR) .......................... 10-2014-0043025

(51) Int. Cl.
*F16H 7/18* (2006.01)
*F16D 41/064* (2006.01)
(Continued)

(52) U.S. Cl.
CPC ............. *F16H 9/10* (2013.01); *F16D 41/063* (2013.01); *F16H 21/28* (2013.01)

(58) Field of Classification Search
CPC . F16H 9/10; F16H 21/28; F16H 21/14; F16H 25/06; F16H 3/76; F16H 7/18;
(Continued)

(56) References Cited

U.S. PATENT DOCUMENTS

| 5,011,458 A * | 4/1991 | Kumm ..................... F16H 9/10 474/49 |
| 2004/0097326 A1* | 5/2004 | Dean ....................... F16H 25/06 475/331 |

(Continued)

FOREIGN PATENT DOCUMENTS

| KR | 10-2000-0068368 | 11/2000 |
| KR | 10-2011-0139805 | 12/2011 |

(Continued)

OTHER PUBLICATIONS

International Search Report for International Application No. PCT/KR2015/003052 dated Aug. 3, 2015.
(Continued)

*Primary Examiner* — William E Dondero
*Assistant Examiner* — Robert T Reese
(74) *Attorney, Agent, or Firm* — Kunzler, PC

(57) ABSTRACT

Disclosed is a continuously variable transmission which can simplify a structure and contribute to miniaturization of a device. A continuously variable transmission including a first disk unit with a first guide slot, a second disk unit with a second guide slot which the first guide slot crosses, and a guide member provided to move along the first guide slot and the second guide slot in response to relative rotation of the second disk unit to the first disk unit, includes: a rotation driving unit rotating any one of the first disk unit and the second disk unit with respect to the other one, wherein the rotation driving unit includes a barrel cam member, a linear movement member linearly moving in response to rotation of the barrel cam member, a driving cam member linearly moving together with the linear movement member, and a driven cam member rotatably connected integrally with any one of the first disk unit and the second disk unit and (Continued)

selectively rotating in response to the linear movement of the driving cam member.

10 Claims, 8 Drawing Sheets

(51) Int. Cl.
*F16H 21/28* (2006.01)
*F16H 9/10* (2006.01)
*F16D 41/063* (2006.01)

(58) Field of Classification Search
CPC ... F16H 9/24; F16H 55/30; F16H 9/14; F16H 9/12; F16H 21/24; F16D 41/063
See application file for complete search history.

(56) References Cited

U.S. PATENT DOCUMENTS

2012/0103743 A1* 5/2012 Hong ............... F16D 41/063
192/45.1
2014/0248981 A1* 9/2014 Lee ..................... F16H 9/12
474/8

FOREIGN PATENT DOCUMENTS

| KR | 10-1351073 | 1/2014 |
| KR | 10-1373453 | 3/2014 |

OTHER PUBLICATIONS

Certificate of Grant for Korean Patent Application No. 10-2014-0043025 dated Jan. 11, 2016.

\* cited by examiner

100

<UNLOCK>

<LOCK>

CONTINUOUSLY VARIABLE TRANSMISSION

TECHNICAL FIELD

The present invention relates to a continuously variable transmission, and more particularly, to a continuously variable transmission which can simplify a structure and contribute to miniaturization.

BACKGROUND ART

In general, transmissions are used for transferring rotary force of an engine or motor to a driving wheel according to a gradient state of a road or driver's will.

The transmissions may be classified into a manual transmission that directly selects a shift level upon the driver's will, an automatic transmission in which shifting is automatically made according to a driving condition of a vehicle, a continuously variable transmission (CVT) in which the shifting continuously varies without a shift area between the shift levels, and the like.

Among, the CVT includes a driving pulley mounted on an input shaft connected with the engine or motor, a driven pulley mounted on an output shaft, and a belt connecting the driving pulley and the driven pulley and operates in such a manner that the shifting is made while an outer diameter of the belt varies with movement of the pulley.

As one of the existing continuously variable transmission, Korean Patent Registration No. 10-1351073 (Jan. 22, 2014) discloses contents regarding a continuously variable transmission in which slots which cross each other are formed on two disks disposed to face each other, respectively and the outer diameter of the driving belt is changed by a sliding pin which moves in a radial direction of the disk while being accommodated in each slot with relative rotation of the respective disks to control an RPM between the driving pulley and the driven pulley.

Moreover, in the existing continuously variable transmission, a spiral spline is formed on a separate movable shaft and a spline groove is formed at a coupling portion of the disk, so as to change the radius of the sliding pin by relatively rotating two disks.

However, in the related art, the relative rotation between the disks is implemented in a spline method by linear movement of the movable shaft, a linear movement section of the movable shaft needs to be particularly secured, and as a result, a structure becomes complicated and it is difficult to manufacture a device in a small size.

Further, since the existing continuously variable transmission uses a rotation method using the spline, rapid and accurate shift control is difficult.

As a result, in recent years, various researches into the continuously variable transmission which can simplify the structure and contribute to miniaturization and is used for rapidly and accurately the shift control have been made, but has not yet been insufficient. Therefore, the development of the corresponding continuously variable transmission has been acutely required.

DETAILED DESCRIPTION OF INVENTION

Technical Problem

The present invention provides a continuously variable transmission which can simplify a structure and contribute to miniaturization of a device.

In particular, the present invention provides a continuously variable transmission which can implement relative rotation between a first disk unit and a second disk unit b using a barrel cam member.

In addition, the present invention provides a continuously variable transmission which can enhance reliability and stability and rapidly and accurately perform shift control.

Technical Solution

In order to achieve the objects, according to an embodiment of the present invention, a continuously variable transmission including a first disk unit with a first guide slot, a second disk unit with a second guide slot which the first guide slot crosses, and a guide member provided to move along the first guide slot and the second guide slot in response to relative rotation of the second disk unit to the first disk unit, includes: a rotation driving unit rotating any one of the first disk unit and the second disk unit with respect to the other one, wherein the rotation driving unit includes a barrel cam member, a linear movement member linearly moving in response to rotation of the barrel cam member, a driving cam member linearly moving together with the linear movement member, and a driven cam member rotatably connected integrally with any one of the first disk unit and the second disk unit and selectively rotating in response to the linear movement of the driving cam member.

According a condition and a design specification which are required, the rotation driving unit may be provided to each of the first disk unit and the second disk unit or to only any one of the first disk unit and the second disk unit. As one example, the rotation driving unit may include a first rotation driving unit provided adjacent to the first disk unit, and a second rotation driving unit provided adjacent to the second disk unit. The respective driven cam members of the first rotation driving unit and the second rotation driving unit may simultaneously rotate in the same direction as each other, and when the driving cam member of any one of the first rotation driving unit and the second rotation driving unit may linearly move in a direction to access the corresponding driven cam member, the driving cam member of the other one of the first rotation driving unit and the second rotation driving unit may linearly move in a direction to be spaced apart from the corresponding driven cam member.

The first disk unit, the second disk unit, and the guide member may be accommodated in a housing and the rotation driving unit may be provided to the outer surface of the housing. In some cases, the rotation driving unit may be configured to be disposed in the housing.

A structure for converting a rotary motion of the barrel cam member into a linear motion of the linear movement member may be variously changed according to the condition and the design specification which are required. As one example, a plurality of cam grooves may be formed on the outer peripheral surface of the barrel cam member and a cam protrusion may be provided in the linear movement member to be movable along the cam groove. In more detail, the linear movement member may include a base portion and a plurality of leg portions which extends to the end of the base portion. The leg portion may mutually cooperatively provide an accommodation space for partially accommodating the barrel cam member ad the cam protrusion may be provided to the end of the leg portion.

The linear movement member may be provided to be linearly movable by various methods according to the condition and the design specification which are required. As one example, a driving unit cover may be coupled to the outer surface of the housing and the linear movement member may be accommodated in the driving unit cover to be linearly movable. Preferably, a first sliding groove corresponding to the base portion and a first sliding groove corresponding to the leg portion may be formed in the driving unit cover so that the linear movement member stably linearly moves and the linear movement member may linearly move along the first sliding groove and the first sliding groove.

Rotation of the driven cam member depending on the linear movement of the driving cam member may be implemented by various methods according to the condition and design specification which are required. As one example, a driving cam profile may be formed in the driving cam member and a driven cam profile that contacts the driving cam profile and converts the linear motion of the driving cam profile into the rotary motion may be formed in the driven cam member.

Further, a connection rod for rotatably connecting the driven cam member integrally with any one of the first disk unit and the second disk unit may be formed in the driven cam member and a guide slot for restricting predetermined or more of rotation of the connection rod may be formed in the other one of the first disk unit and the second disk unit.

A rotating operation of the barrel cam member may be implemented by various methods according to the condition and design specification which are required. As one example, an operation member may be connected to the barrel cam member and the operation member may be exposed to the outside of the housing to be operable outside the housing.

Further, the continuously variable transmission may include a one way clutch for permitting only one way rotation of the guide member. As one example, the one way clutch may include an outer race, an inner race disposed in the outer race to be coaxially rotatable, and a wedge type clutch element provided between the outer race and the inner race, an element accommodation unit may be provided, which includes a plane floor portion formed to be inclined to a tangential direction of an outer peripheral surface of the inner race so that one end of both ends of the inner race is relatively closer to the center of the inner race at at least any one side of interfaces of the outer race and the inner race, a first wall portion formed from one end of the plane floor portion relatively closer to the center of the inner race between both ends of the plane floor portion up to the outer peripheral surface of the inner race, and a second wall portion formed from the other end of the plane floor portion up to the outer peripheral surface of the inner race, the clutch element may include a plane contact portion plan-contacting the element accommodation unit and a curved clamping portion facing the plane contact portion, and is disposed between the first wall portion and the second wall portion, and the curved clamping portion may be provided to surface-contact an inner peripheral surface of the outer race in a rotational direction of the outer race to the inner race to be selectively locked or unlocked on the inner peripheral surface of the outer race.

Advantageous Effects

A continuously variable transmission according to the present invention can simplify a structure and contribute to miniaturization of a device.

In particular, according to the present invention, a driving cam member rotates a driven cam member by linear movement of a linear movement member depending on rotation of a barrel cam member, and as a result, a first disk unit and a second disk unit can relatively rotate to minimize a structure for relatively rotating the first disk unit and the second disk unit and an actuation space required for the structure.

Moreover, according to the present invention, since the barrel cam member, the linear movement member, and the driving cam member may be actuated while being disposed to substantially overlap with each other coaxially with each other, spaces required for layout and actuation of each component can be minimized.

Further, according to the present invention, since the first disk unit and the second disk unit can relatively rotate by the rotation of the barrel cam member, a relative rotational direction between the first disk unit and the second disk unit can be rapidly switched. Accordingly, according to the present invention, rapid and accurate shift control is possible and shifting shock can be reduced.

Further, according to the present invention, as a one way clutch, a wedge type clutch element including a plane contact portion and a curved clamping portion is used to improve clamping force and enable rapidly switching of lock and unlock. Accordingly, according to the present invention, rapid and accurate shift control is possible and shifting shock can be reduced.

Further, in the case of the existing one way clutch, when a ball or the roller is abraded or stabbed by a repeated clutch operation, it is difficult that the ball or roller plays a proper role thereof, but in the present invention, since the curved clamping portion of the clutch element can perform a clutch operation through surface contacting, the clutch element can play the proper role thereof even though the clutch element is abraded by the repeated clutch operation. Moreover, according to the present invention, since an allowance tolerance can be provided between a second wall portion and the clutch element in a lock state of the clutch element, a lock operation between the curved clamping portion and the outer race can be normally performed by an allowance tolerance section even though the curved clamping portion and the inner peripheral surface of the outer race are abraded with a predetermined degree by the repeated clutch operation.

BEST MODE

Figure 1:
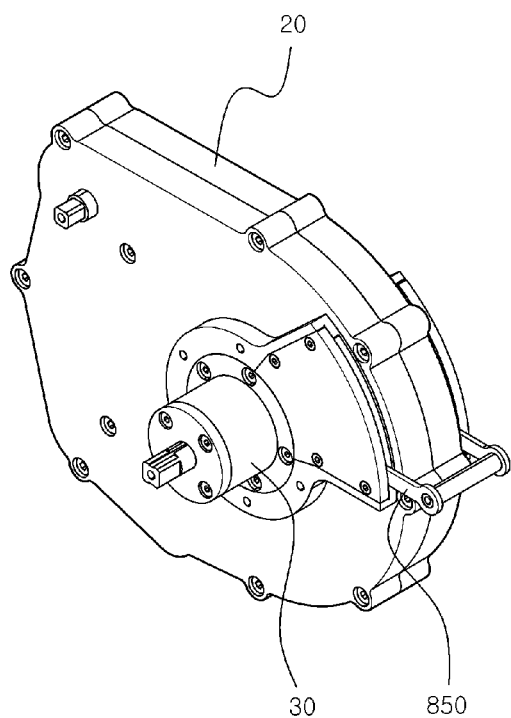
FIG. 1 is a diagram for describing a continuously variable transmission according to the present invention.

Hereinafter, embodiments of the present invention will be described in detail with reference to the accompanying drawings, but the present invention is not limited or restricted to the embodiments. For reference, in the description, like reference numerals substantially refer to like elements, which may be described by citing contents disclosed in other drawings under such a rule and contents determined to be apparent to those skilled in the art or repeated may be omitted.

Figure 2:
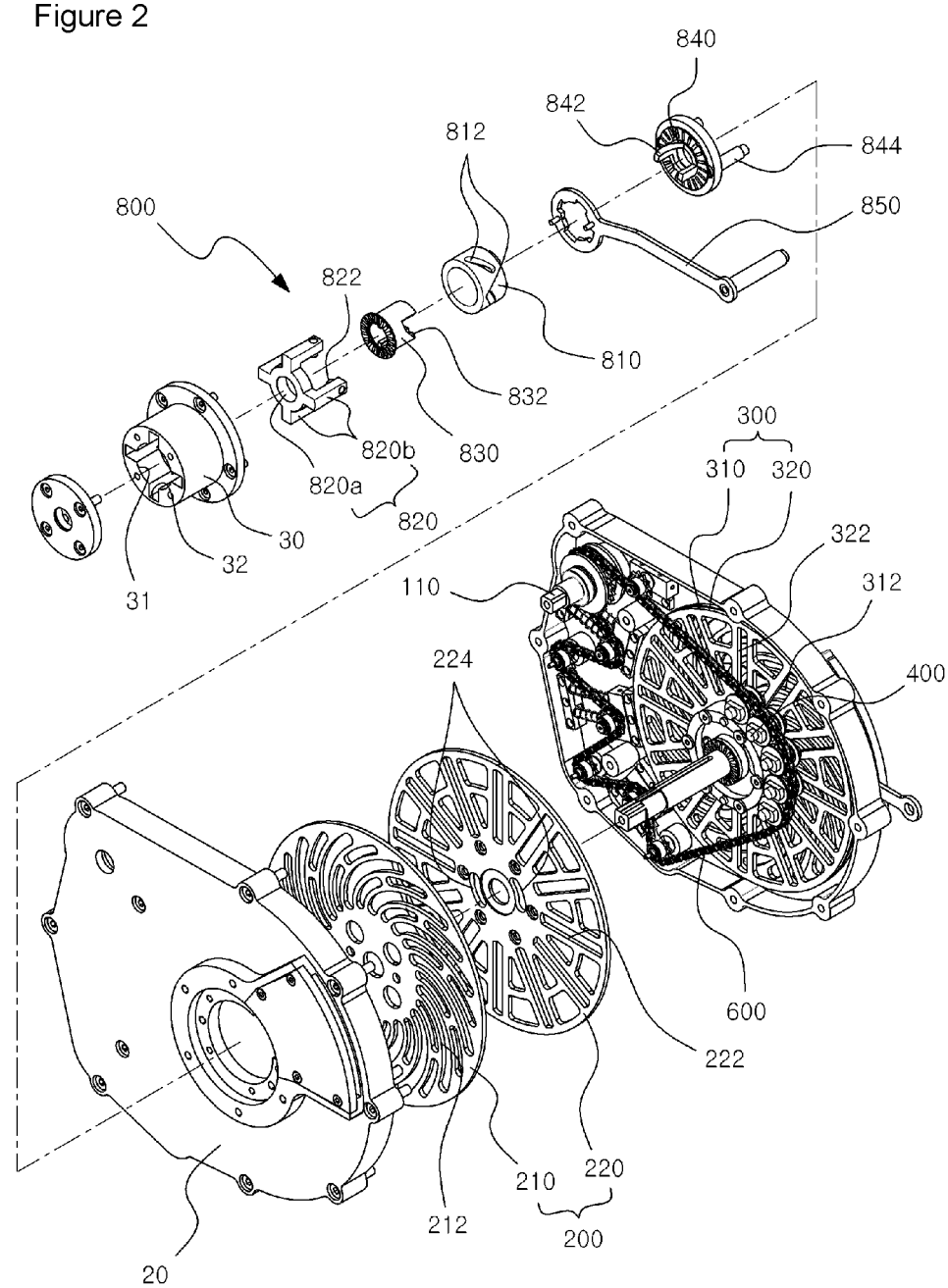
FIGS. 2 and 3 are diagrams for describing the structure of a rotation driving unit as the continuously variable transmission according to the present invention.
Figure 3:
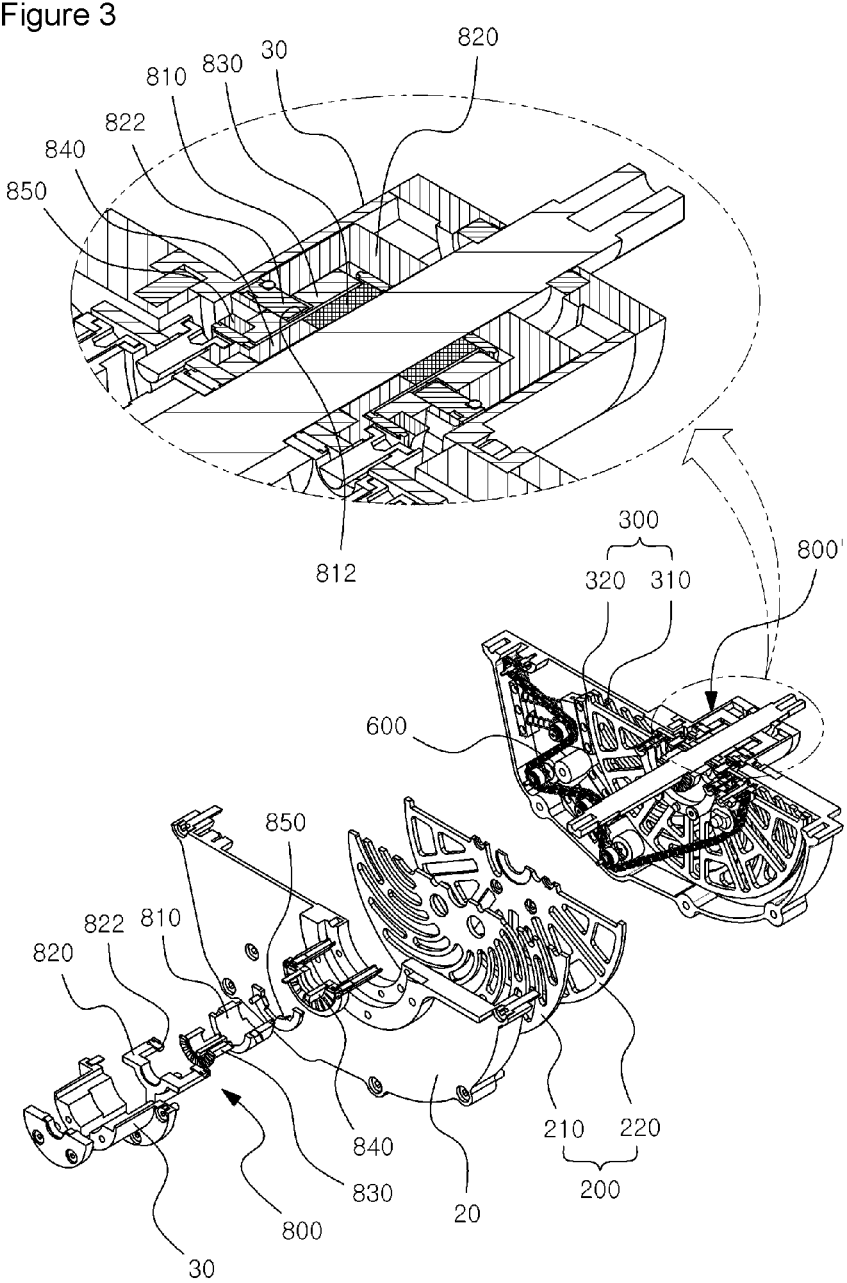
Figure 4:
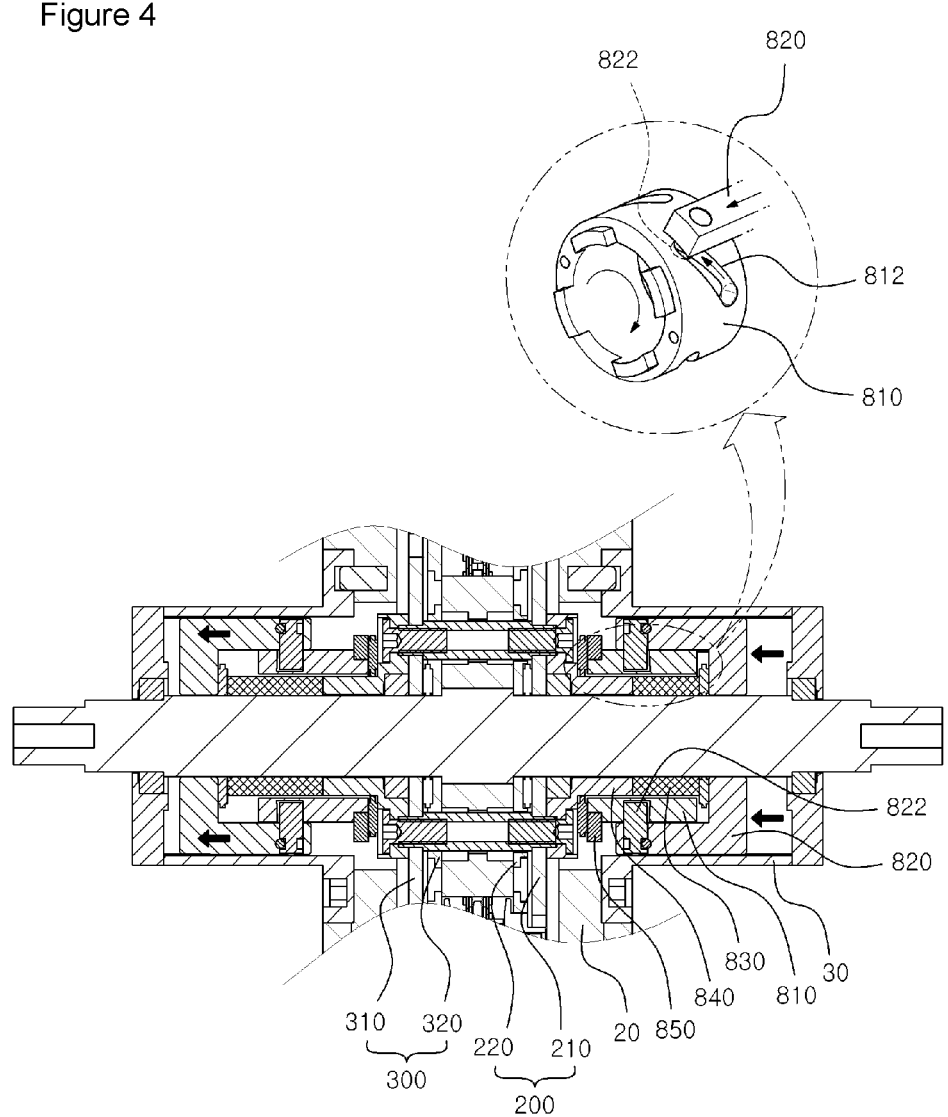
FIGS. 4 and 5 are diagrams for describing an operation structure of the rotation driving unit as the continuously variable transmission according to the present invention.
Figure 5:
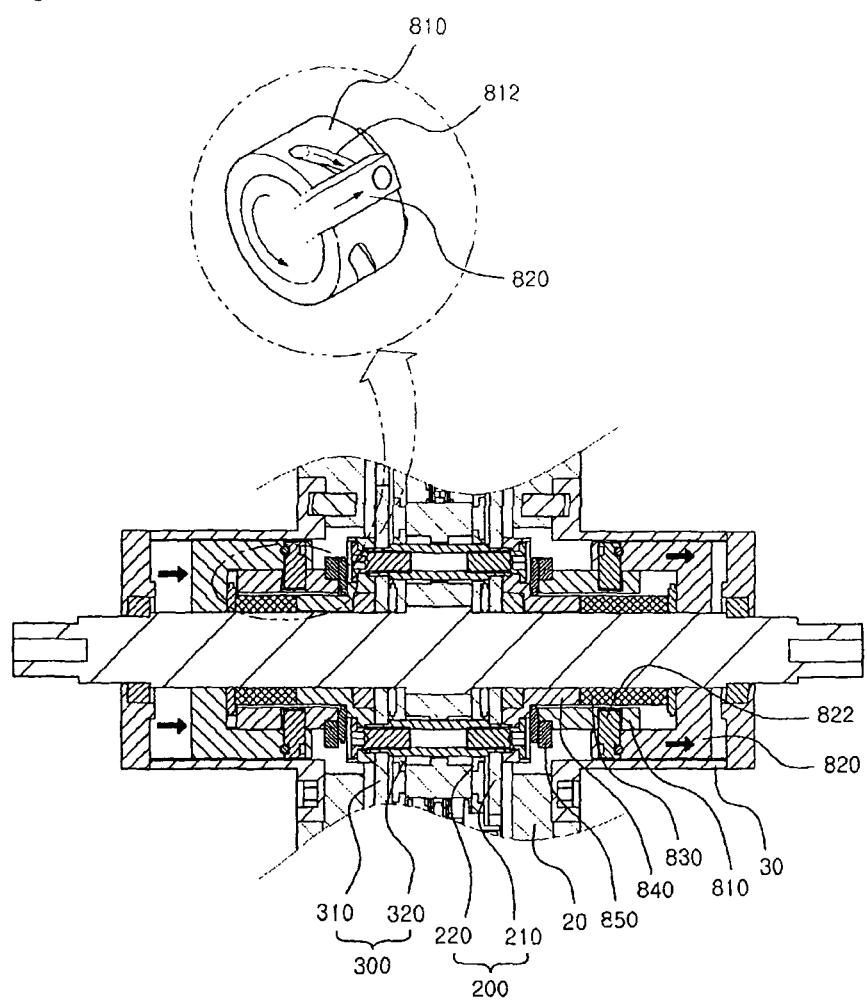
Figure 6:
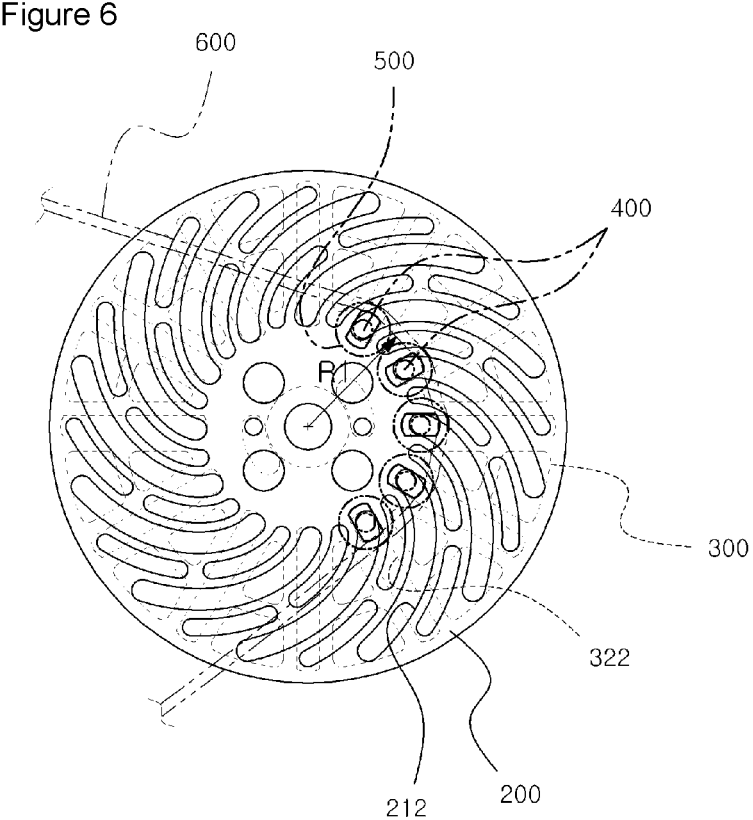
FIGS. 6 and 7 are diagrams for describing the operation structure of the continuously variable transmission according to the present invention.
Figure 7:
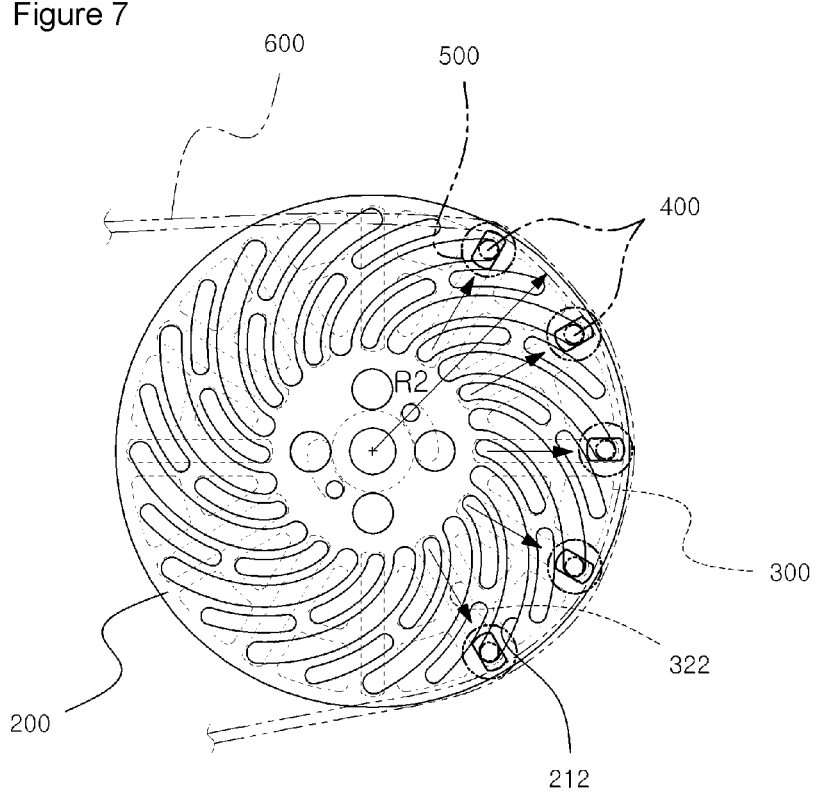

FIG. 1 is a diagram for describing a continuously variable transmission according to the present invention, FIGS. 2 and 3 are diagrams for describing the structure of a rotation driving unit as the continuously variable transmission according to the present invention, FIGS. 4 and 5 are diagrams for describing an operation structure of the rotation driving unit as the continuously variable transmission according to the present invention, and FIGS. 6 and 7 are diagrams for describing the operation structure of the continuously variable transmission according to the present invention.

Referring to FIGS. 1 to 7, the continuously variable transmission 100 according to the present invention may include a first disk unit 200, a second disk unit 300, a guide member 400, and rotation driving units 800 and 800'.

The first disk unit 200 and the second disk unit 300 are disposed to be spaced apart from each other at a predetermined interval and the guide member 400 is provided between the first disk unit 200 and the second disk unit 300 so as to move in a radial direction.

The first disk unit 200 may be constituted by only one disk member or a plurality of disk members according to the condition the design specification which are required. As one example, the first disk unit 200 may include a plurality of first disk members 210 and 220 and first guide slots 224/212 and 222 may be formed in the first disk members 210 and 220, respectively.

Hereinafter, an example in which the first guide slots 224/212 and 222 formed in the first disk members 210 and 220 are formed to cross each other will be described. As one example, the first guide slots 224/212 and 222 radially formed in any one first disk member 210 or 220 of two first disk members 210 and 220 may be formed in an involute curve form and the first guide slots 224/212 and 222 radially formed in the other first disk member 210 or 220 of two first disk members 210 and 220 may be formed in a straight form. Such a structure may prevent twisting and abnormal movement when the guide member 400 to be described below moves. Moreover, since the first guide slots 224/212 and 222 radially formed in any one of the first disk members 210 and 220 may be formed in the involute curve form, interference between the guide members 400 may be prevented during a shift operation.

The second disk unit 300 may be constituted by only one disk member or the plurality of disk members according to the condition the design specification which are required. As one example, the second disk unit 300 may include a plurality of second disk members 310 and 320 and second guide slots 224/312 and 322 crossing the first guide slots 224/212 and 222 may be formed in the second disk members 310 and 320, respectively. Hereinafter, an example in which the second guide slots 224/312 and 322 formed in the second disk members 310 and 320 are formed to cross each other will be described. As one example, the second guide slots 224/312 and 322 radially formed in any one second disk member 310 or 320 of two second disk members 310 and 320 may be formed in an involute curve form and the second guide slots 224/312 and 322 radially formed in the other second disk member 310 or 320 of two second disk members 310 and 320 may be formed in a straight form.

For reference, in the embodiment of the present invention, an example in which each of the first disk unit and the second disk unit is configured to include the plurality of disk members is described, but in some cases, any one of the first disk unit and the second disk may be constituted by the single disk member and the other one may be configured to include the plurality of disk members.

The guide member 400 is provided to define a rotary radius of a power transmission member 600.

Herein, defining the rotary radius of the power transmission member 600 by the guide member 400 may be appreciated as defining the rotary radius (a rotation trajectory radius) of the power transmission member 600 by a plurality of guide members 400 by commonly winding the power transmission member 600 on the circumferences of the plurality of guide members 400.

Further, the rotary radius of the power transmission member 600 wound on the circumference of the guide member 400 may vary in response to the movement of the guide member 400 in the radial directions of the first disk unit 200 and the second disk unit 300.

That is, one end of the guide member 400 may move along the first guide slots 224/212 and 222 while being accommodated in the first guide slots 224/212 and 222 and the other end of the guide member 400 may move along the second guide slots 224/312 and 322 while being accommodated in the second guide slots 224/312 and 322.

As the second disk unit 300 rotates with respect to the first disk unit 200 (alternatively, the first disk unit rotates with respect to the second disk unit), the guide member 400 moves along the first guide slots 224/212 and 222 and the second guide slots 224/312 and 322 to move in the radial directions of the first disk unit 200 and the second disk unit 300. Moreover, end finishing units 551 and 552 for guiding the movement of the guide member 400 may be coupled to both ends of the guide member 400 in order to prevent the power transmission member from being removed.

The rotation driving units 800 and 800' are provided to rotate any one of the first disk unit 200 and the second disk unit 300 with respect to the other one. Hereinafter, an example in which the rotation driving units 800 and 800' are provided in the first disk unit 200 including a plurality of first disk members 210 and 220 and the second disk unit 300 including a plurality of second disk members 310 and 320, respectively will be described. That is, the first rotation driving unit 800 adjacent to the first disk unit 200 may rotate the other one with respect to any one of the plurality of first disk units 210 and 220 and the other second rotation driving unit 800' adjacent to the second disk unit 300 may rotate the other one with respect to any one of the plurality of second disk members 310 and 320. In some cases, the rotation driving unit may be provided to only any one of the first disk unit and the second disk unit.

In addition, the rotation driving units 800/800' includes a barrel cam member 810, a linear movement member 820, a driving cam member 830, and a driven cam member 840.

For reference, the first disk unit 200, the second disk unit 300, and the guide member 400 may be accommodated in a housing 20 and the rotation driving unit 800/800' may be provided on an outer surface of the housing 20. In some cases, the rotation driving unit may be configured to be disposed in the housing.

The barrel cam member 810 may be provided to be rotatable with respect to the first disk unit 200 (alternatively, second disk unit) and the linear movement member 820 is configured to linearly move in response with rotation of the barrel cam member 810. Hereinafter, an example in which the barrel cam member 810 is disposed to be rotatable coaxially with the first disk units 210 and 220) (alternatively, second disk) and the linear movement member 820 is configured to linearly move in axial directions of the first disk members 210 and 220 in response to the rotation of the barrel cam member 810 will be described.

A structure for converting a rotary motion of the barrel cam member 810 into a linear motion of the linear movement member 820 may be variously changed according to a condition and a design specification which are required. As one example, a plurality of cam grooves 812 may be formed on the outer periphery of the barrel cam member 810 and a cam protrusion 822 may be provided in the linear movement member 820 to be movable along the cam groove 812. When the barrel cam member 810 rotates, the cam protrusion 822 moves along the cam groove 812, the rotary motion of the barrel cam member 810 may be converted into the linear motion of the linear movement member 820.

In more detail, the linear movement member 820 may include a plurality of leg portions 820b which extends to the end of a base portion 820a in the axial directions of a substantially ring-shaped base portion 820a and the first disk members 210 and 220. The leg portion 820b may mutually cooperatively provide an accommodation space for partially accommodating the barrel cam member 810 and the cam protrusion 820 may be provided to the end of the leg portion 820b. Hereinafter, an example in which the linear movement member 820 is configured to include four leg portions 820b will be described. In some cases, the linear movement member may include leg portions less than 4 or equal to or more than 5.

As described above, since the linear movement member 820 and the barrel cam member 810 may be coaxially disposed to overlap with each other, spaces required for layouts and operations of the linear movement member 820 and the barrel cam member 810.

For reference, the linear movement member 820 may be provided to be linearly movable by various methods according to the condition and the design specification which are required. As one example, a driving unit cover 30 may be coupled to the outer surface of the housing 20 and the linear movement member 820 may be accommodated to be linearly movable in the driving unit cover 30. A first sliding groove 31 corresponding to the base portion 820a and a first sliding groove 32 corresponding to the leg portion 820b may be formed in the driving unit cover 30 so that the linear movement member 820 stably linearly moves and the linear movement member 820 may linearly move along the first sliding groove 31 and the first sliding groove 32.

The driving cam member 830 may be configured to linearly move in the axial direction of the first disk unit 200 together with the linear movement member 820 in response to the linear movement of the linear movement member 820 and a driving cam profile 832 having a height difference in a linear movement direction of the driving cam member 830 may be formed at the end of the driving cam member 830. Preferably, the driving cam member 830 may be accommodated in the barrel cam member 810 so as to minimize the layout and the operation space of the driving cam member 830.

The driven cam member 840 is rotatably connected integrally with any one of the first disk unit 200 and the second disk unit 300 and configured to selectively rotate in response to the linear movement of the driving cam member 830. As one example, the driven cam member 840 of the rotation driving unit 800/800' adjacent to the first disk unit 200 may be rotatably connected integrally with any one of two first disk members 210 and 220 constituting the first disk unit 200 and the driven cam member 840 of the other rotation driving unit 800'800' adjacent to the second disk unit 300 may be rotatably connected integrally with any one of two second disk members 310 and 320 constituting the second disk unit 300.

A driven cam profile 842 that contacts the driving cam profile 832 and converts the linear motion of the driving cam profile 832 into the rotary motion may be formed the end of the driven cam member 840 facing the driving cam profile 832 of the driving cam member 830.

For reference, a rotational angle of the driven cam member 840 by the linear motion of the driving cam member 830 may be appropriately changed by the structures of the driving cam profile 832 and the driven cam profile 842 and the present invention is not restricted or limited by the structures and the characteristics of the driving cam profile 832 and the driven cam profile 842.

Further, a connection rod 844 for rotatably connecting the driven cam member 840 integrally with any one of the first disk unit 200 and the second disk unit 300 may be formed in the driven cam member 840 and an arc-shaped guide slot 224 for restricting predetermined or more of rotation of the connection rod 844 may be formed in any one of the first disk unit 200 and the second disk unit 300. Herein, restricting the predetermined or more of rotation of the connection rod 844 may be appreciated as a state of restricting the predetermined or more of rotation of the first disk unit 200 or the second disk unit 300 which rotates by the driven cam member 840.

A rotating operation of the barrel cam member 810 may be implemented by various methods according to the condition and design specification which are required. As one example, an operation member 850 may be connected to the barrel cam member 810 and the operation member 850 may be exposed to the outside of the housing 20 to be operable outside the housing 20.

For reference, in the embodiment, an example in which two rotation driving units 800 and 800' are configured to interlock with each other by one operation member 850 is described, but in some cases, two rotation driving units may be configured to operate by separate operation members, respectively.

By such a structure, the barrel cam member 810 may rotate by the rotating operation of the operation member 850, the driving cam member 830 may linearly move together by the linear movement of the linear movement member 820 depending on the rotation of the barrel cam member 81-, and the driven cam member 840 may rotate by interaction between the driving cam member 830 and the driven cam member 840 depending on the linear movement of the driving cam member 830.

For reference, the respective driven cam members of the first rotation driving unit 800 and the second rotation driving unit 800' are configured to simultaneously rotate in the same direction as each other and as the respective driven cam members simultaneously rotate, the first disk member 210 outside the first disk unit 200 connected to each driven cam member and the second disk member 310 outside the second disk unit 300 may simultaneously rotate in the same direction as each other (clockwise or counterclockwise).

Further, when the driving cam member of any one of the first rotation driving unit 800 and the second rotation driving unit 800' linearly moves in a direction to access the corresponding driven cam member, the driving cam member of the other one of the first rotation driving unit 800 and the second rotation driving unit 800' may linearly move in a direction to be spaced apart from the corresponding driven cam member.

For example, when the driving cam member of the first rotation driving unit 800 moves in the direction to access the driven cam member of the first rotation driving unit 800 by a downward rotating operation of the operation member 850, as the driven cam member of the first rotation driving unit 800 rotates by the interaction between the driving cam member of the first rotation driving unit 800 and the driven can member of the first rotation driving unit 800, the driven cam member of the second rotation driving unit 800' may also rotate in the same direction together, and as a result, the driving cam member of the second rotation driving unit 800' may linearly move in a direction to be spaced apart from the driven cam member of the second rotation driving unit 800'.

On the contrary, when the driving cam member of the second rotation driving unit 800' moves in the direction to access the driven cam member of the second rotation driving unit 800' by an upward rotating operation of the operation member 850, as the driven cam member of the second rotation driving unit 800' rotates by the interaction between the driving cam member of the second rotation driving unit 800' and the driven can member of the second rotation driving unit 800', the driven cam member of the second rotation driving unit 800' may also rotate in the same direction together, and as a result, the driving cam member of the first rotation driving unit 800 may linearly move in a direction to be spaced apart from the driven cam member of the first rotation driving unit 800 (see FIGS. 4 and 5).

For reference, when each driven cam member 840 rotates, the first disk member 210 and the second disk member 310 disposed at a relatively outer side may simultaneously relatively rotate with respect to the first disk member 220 and the second disk member 320 disposed at a relatively inner side.

As described above, the first disk unit 200 and the second disk unit 300 may relatively rotate by the driven cam member 840, as the guide member 400 moves in the radial direction of the first disk unit 200 by relative rotation of the first disk unit 200 and the second disk unit 300 to the first disk unit 200, a rotary radius (a rotation trajectory radius) of a power transmission member 600 may vary and driving force by simultaneous rotation of the first disk unit 200 and the second disk unit 300 is transferred to an output shaft 110 through the power transmission member 600 to be output (see FIGS. 6 and 7).

Moreover, the continuously variable transmission may include a tension control means for controlling tension of the power transmission member 600 and the tension of the power transmission member 600 may be appropriately controlled by the tension control means.

Figure 8:
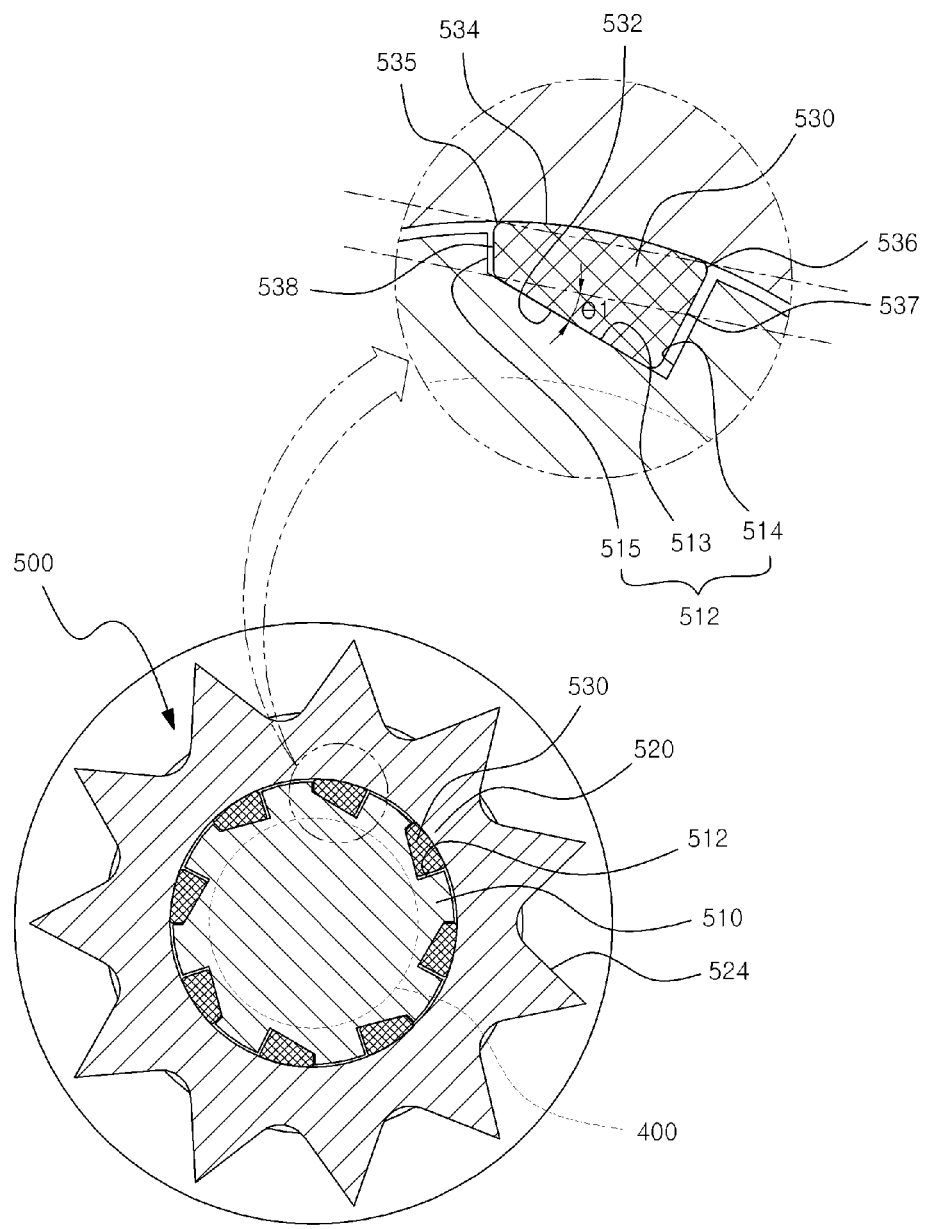
FIGS. 8 to 10 are diagrams for describing the structure and the operation structure of a one way clutch as the continuously variable transmission according to the present invention.
Figure 9:
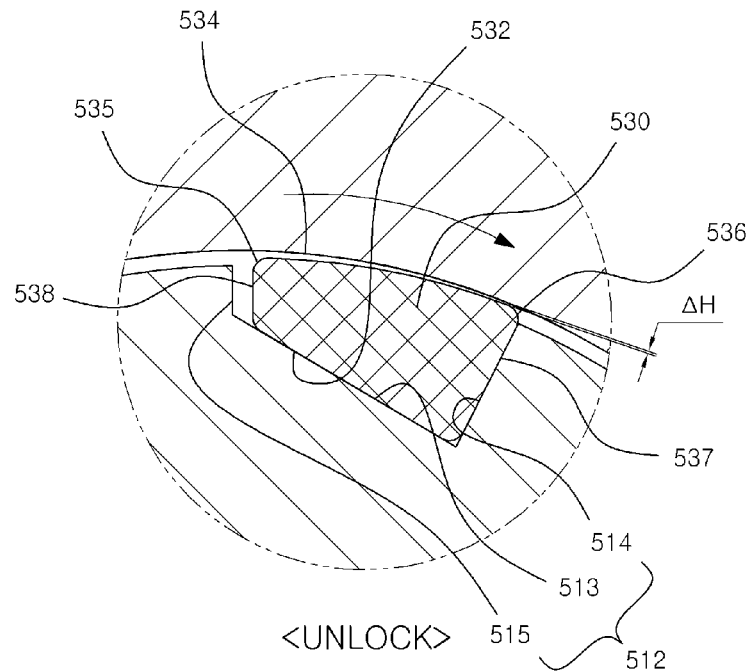
Figure 10:
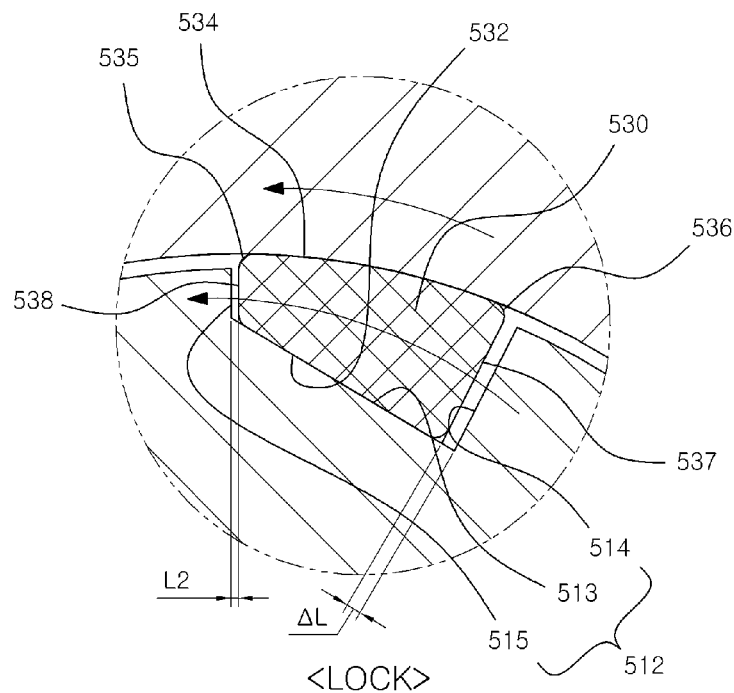

Meanwhile, FIGS. 8 to 10 are diagrams for describing the structure and the operation structure of a one way clutch as the continuously variable transmission according to the present invention.

Referring to FIGS. 8 to 10, a one way clutch 500 for permitting only one way rotation of the guide member 400 may be provided in the guide member 400 so as to maintain continuity and stability of power transmission during the shifting process. As one example, the one way clutch 500 may include an inner race 510, an outer race 520, and a clutch element 530.

The inner race 510 may be integrally provided to the guide member 400 and an element accommodation unit 512 for accommodating the clutch element 530 to be described below is formed on the outer peripheral surface of the inner race 510. For reference, in the present invention, integrally providing the inner race 510 to the guide member 400 may be appreciated as a state in which the inner race 510 and the guide member 400 are integrally rotatably coupled to each other. As one example, the inner race and the guide member may be separately formed and thereafter, integrally rotatably coupled. As another example, the inner race may be directly formed on the outer peripheral surface of the guide member.

The outer race 520 is coaxially disposed on an exterior of the inner race 510 to be relatively rotatable to the inner race 510.

The clutch element 530 is accommodated in the element accommodation unit 512 of the inner race 510 and selectively locked or unlocked on the inner peripheral surface of the outer race 520 according to a rotational direction of the outer race 520 to the inner race 510.

Herein, a state in which the clutch element 530 is locked on the inner peripheral surface of the outer race 520 may be appreciated as a state in which rotation of the clutch element 530 to the outer race 520 is restricted and in the state in which the rotation of the clutch element 530 to the outer race 520 is restricted, relative rotation of the outer race 520 to the inner race 510 may be restricted.

Further, a state in which the clutch element 530 is unlocked on the inner peripheral surface of the outer race 520 may be appreciated as a state in which the rotation of the clutch element 530 to the outer race 520 is permitted and in the state in which the rotation of the clutch element 530 to the outer race 520 is permitted, the relative rotation of the outer race 520 to the inner race 510 may be permitted.

The element accommodation unit 512 is provided to have a size to partially accommodate the clutch element 530 and while the clutch element 530 is partially accommodated by the element accommodation unit 512, the clutch element 530 may be selectively locked or unlocked on the inner peripheral surface of the outer race 520 according to the rotational direction of the outer race 520 to the inner race 510.

In more detail, the element accommodation unit 512 includes a plane floor portion 513 formed to be inclined to a tangential direction of the outer peripheral surface of the inner race 510 so that one end of both ends is relatively closer to the center of the inner race 510, a first wall portion 514 formed from one end of the plane floor portion 513 relatively closer to the center of the inner race 510 between both ends of the plane floor portion 513 up to the outer peripheral surface of the inner race 510, and a second wall portion 515 formed from the other end of the plane floor portion 513 up to the outer peripheral surface of the inner race 510 and is formed in a substantially "∟"-shape groove form.

The clutch element 530 includes a plane contact portion 532 surface-contacting the plane floor portion 513 and a curved clamping portion 534 which may surface-contact the inner peripheral surface of the outer race 520 and is formed in a substantially wedge form and is accommodated in the element accommodation unit 512 to be disposed between the first wall portion 514 and the second wall portion 515. Moreover, hereinafter, an end of the clutch element 530 facing the first wall portion 514 will be referred to as a first end 537 and the other end of the clutch element 530 facing the second wall portion 515 will be referred to as a second end 538.

The plane contact portion 532 of the clutch element 530 may move on the element accommodation unit 1 while surface-contacting the plane floor portion 513 according to the rotational direction of the second disk unit 300 to the first disk unit 200 and the curved clamping portion 534 may selectively contact the inner peripheral surface of the outer race 520 according to the rotational direction of the second disk unit 300 to the first disk unit 200. For reference, the state in which the curved clamping portion 534 contacts the inner peripheral surface of the outer race 520 may be appreciated as the state in which the clutch element 530 is locked on the inner peripheral surface of the outer race 520, and as a result, the relative rotation of the outer race 520 to the inner race 510 may be restricted by clamping force (friction force) depending on the contacting of the clutch element 530 to the inner peripheral surface of the outer race 520 and the inner race 510 may rotate in one same direction together to correspond to the unidirectional rotation of the outer race 520.

The number of element accommodation units 512 and the number of clutch elements 530 corresponding thereto may be appropriately changed according to a condition and a design specification which are required. Preferably, even (for example, 6, 8, 10, 12, and the like) element accommodation units 512 and clutch elements 530 may be provided at an even interval in a circumferential direction of the inner race 510 so as to be symmetric to each other based on the center of the inner race 510. In some cases, odd (for example, 5, 7, 9, and the like) element accommodation units 512 and clutch elements 530 may be provided to be asymmetric to each other based on the center of the inner race, but when odd element accommodation units and clutch elements are provided, the backlash and slip phenomena occur during switching of the lock and the unlock and when even element accommodation units and clutch elements are provided to be asymmetric to each other based on the center of the inner race, the backlash and slip phenomena occur during switching of the lock and the unlock, and as a result, even element accommodation units and clutch elements are preferably provided in the circumference direction of the inner race to be symmetric to each other based on the center of the inner race.

As described above, in the present invention, the clutch element 530 is formed in a wedge form including the plane contact portion 532 and the curved clamping portion 534 to provide sufficient clamping force, reduce the slip and backlash phenomena, and enable the rapid switching of the lock and the unlock.

Design conditions of the element accommodation unit 512 and the clutch element 530 may be appropriately changed according to the condition and the design specification which are required.

Preferably, referring to FIG. 9, so as to rapidly switch the lock and the unlock, while the clutch element 530 is unlocked on the inner peripheral surface of the outer race 520, the gap $\Delta H$ of 0.001 to 0.05 mm may be provided between the curved clamping portion 534 and the inner peripheral surface of the outer race 520. For reference, since when the gap $\Delta H$ between the curved clamping portion 534 and the inner peripheral surface of the outer race 520 is smaller than 0.001 mm in the unlocked state, it is difficult to rapidly switch the lock and the unlock and when the gap $\Delta H$ between the curved clamping portion 534 and the inner peripheral surface of the outer race 520 is smaller than 0.05 mm in the unlocked state, the backlash phenomenon occurs at the time of rapidly switching the lock and the unlock, it is preferable that the gap $\Delta H$ of 0.001 to 0.05 mm is provided between the curved clamping portion 534 and the inner peripheral surface of the outer race 520 while the clutch element 530 is unlocked on the inner peripheral surface of the outer race 520. More preferably, the gap $\Delta H$ of 0.2 mm may be provided between the curved clamping portion 534 and the inner peripheral surface of the outer race 520 in the unlocked state.

An angle $\theta 1$ of the plane contact portion 532 for a chord of the curved clamping portion 534 may be configured in the range of 5 to 20°. That is, when the angle $\theta 1$ of the plane contact portion 532 for the chord of the curved clamping portion 534 is smaller than 5°, comparatively large rotational force needs to be required at the time of switching the lock and the unlock and when the angle $\theta 1$ of the plane contact portion 532 for the chord of the curved clamping portion 534 is smaller than 20°, it is difficult to guarantee the sufficient clamping force and it is difficult to stably maintain the lock and unlock states, and as a result, the angle $\theta 1$ of the plane contact portion 532 for the chord of the plane clamping portion 534 is preferably configured in the range of 5 to 20°.

More preferably, under such a condition, a movement distance $\Delta L$ of the clutch element 530 to the plane floor portion 513 may be configured in the range of 0.003 mm to 0.572 mm at the time of switching the lock and the unlock of the clutch element 530. Herein, the movement distance $\Delta L$ of the clutch element 530 to the plane floor portion 513 may be appreciated as a straight movement distance of the plane contact portion 532 which moves in the surface contact state on the plane floor portion 513 at the time of switching the lock and the unlock.

Further, referring to FIG. 10, an allowance tolerance L2 may be provided between the second wall portion 515 and the clutch element 530 in the lock state of the clutch element 530. In such a structure, even though the curved clamping portion 534 and the inner peripheral surface of the outer race 520 are abraded by the repeated clutch operation, a lock operation between the curved clamping portion 534 and the outer race 520 may be normally performed by the allowance tolerance section. The allowance tolerance L2 may be appropriately changed according to the condition and design specification which are required. Preferably, when the allowance tolerance L2 may be configured as a value larger than 0.2 mm and more preferably, the allowance tolerance L2 may be provided in the range of 0.2 mm to 1 mm.

When the clutch element 530 is abreacted with a predetermined degree or more by the repeated clutch operation (lock and unlock switching), the second end 538 of the clutch element 530 is restricted by the second wall portion 515 to prevent a lock inability state depending on the abrasion.

Further, referring to FIG. 8, round processing units 535 and 536 may be formed at corners of the clutch element 530 exposed to the outside of the element accommodation unit 512. In more detail, the round processing units 535 and 536 having predetermined radii may be formed at the corner of the first end 537 and the corner of the second end 538 adjacent to the inner peripheral surface of the outer race 520. The round processing units 535 and 536 may prevent a phenomenon in which the corner of the clutch element 530 is stabbed on the inner peripheral surface of the outer race 520 at the time of switching the lock and the unlock of the clutch element 530.

Meanwhile, as the power transmission member 600, a general belt or chain may be used and the present invention is not restricted or limited by the type and the characteristic of the power transmission member 600. Hereinafter, as the power transmission member 600, the general chain may be used and an example in which a gear portion 524 which engages with the chain is formed on the outer peripheral surface of the outer race 520 will be described.

Further, the continuously variable transmission according to the present invention may further include a return means (not illustrated) providing return force when the clutch element in the locked state is returned in the unlocked state.

As the return means, various return means capable of providing the return force pushing the clutch element adjacent to the first wall portion to the second wall portion may be used. As one example, the return means may include a first magnet coating layer formed on the surface of the first wall portion and a second magnet coating layer formed on the surface of the clutch element facing the first wall portion to have repulsive force with the first magnet coating layer.

The first magnet coating layer and the second magnet coating layer may be made of a general magnetic material such as ferrite and the present invention is not restricted or limited by the material. Differently, as the return means, an elastic member such as a spring member may be used.

The present invention has been described with reference to the preferred embodiments of the present application. However, it will be appreciated by those skilled in the art that various modifications and changes of the present invention can be made without departing from the spirit and the scope of the present invention which are defined in the appended claims and their equivalents.

The invention claimed is:

1. A continuously variable transmission including a first disk unit with a first guide slot, a second disk unit with a second guide slot which the first guide slot crosses, and a guide member provided to move along the first guide slot and the second guide slot in response to relative rotation of the second disk unit to the first disk unit, the continuously variable transmission comprising:
   a rotation driving unit rotating any one of the first disk unit and the second disk unit with respect to the other one,
   wherein the rotation driving unit includes
   a barrel cam member,
   a linear movement member linearly moving in response to rotation of the barrel cam member,
   a driving cam member in which a driving cam profile is formed, linearly moving together with the linear movement member, and
   a driven cam member rotatably in which a driven cam profile that contacts the driving cam profile and converts the linear motion of the driving cam profile into the rotary motion is formed, being connected integrally with any one of the first disk unit and the second disk unit and selectively rotating in response to the linear movement of the driving cam member.

2. The continuously variable transmission of claim 1, wherein a cam groove is formed on the outer peripheral surface of the barrel cam member, and
   a cam protrusion is provided in the linear movement member to be movable along the cam groove.

3. The continuously variable transmission of claim 1, wherein the linear movement member includes
   a base portion, and
   a plurality of leg portions which extends to the end of the base portion and providing an accommodation space for mutually cooperatively accommodating the barrel cam member, and
   the driving cam member is accommodated in the barrel cam member.

4. The continuously variable transmission of claim 1, wherein a connection rod for rotatably connecting the driven cam member integrally with any one of the first disk unit and the second disk unit is formed in the driven cam member, and
   a guide slot for restricting predetermined or more of rotation of the connection rod is formed in the other one of the first disk unit and the second disk unit.

5. The continuously variable transmission of claim 1, further comprising:
   a housing accommodating the first disk unit, the second disk unit, and the guide member therein; and
   a driving unit cover coupled to the outer surface of the housing,
   wherein the linear movement member is accommodated in the driving unit cover to be linearly movable.

6. The continuously variable transmission of claim 5, wherein a sliding groove corresponding to the linear movement member is formed in the driving unit cover.

7. The continuously variable transmission of claim 1, further comprising:
   an operation member connected to the barrel cam member,
   wherein the barrel cam member selectively rotates by a rotating operation of the operation member.

8. The continuously variable transmission of claim 1, wherein the rotation driving unit includes
   a first rotation driving unit provided adjacent to the first disk unit, and
   a second rotation driving unit provided adjacent to the second disk unit, and
   the respective driven cam members of the first rotation driving unit and the second rotation driving unit simultaneously rotate in the same direction as each other, and
   when the driving cam member of any one of the first rotation driving unit and the second rotation driving unit linearly moves in a direction to access the corresponding driven cam member, the driving cam member of the other one of the first rotation driving unit and the second rotation driving unit linearly moves in a direction to be spaced apart from the corresponding driven cam member.

9. The continuously variable transmission of claim 1, wherein at least any one of the first disk unit and the second disk unit includes a single or a plurality of disk members.

10. The continuously variable transmission of claim 1, further comprising:
    a one way clutch integrally provided to the guide member,
    wherein the one way clutch includes,
    an outer race,
    an inner race disposed in the outer race to be coaxially rotatable, and
    a wedge type clutch element provided between the outer race and the inner race,
    an element accommodation unit is provided, which includes a plane floor portion formed to be inclined to a tangential direction of an outer peripheral surface of the inner race so that one end of both ends of the inner race is relatively closer to the center of the inner race at at least any one side of interfaces of the outer race and the inner race, a first wall portion formed from one end of the plane floor portion relatively closer to the center of the inner race between both ends of the plane floor portion up to the outer peripheral surface of the inner race, and a second wall portion formed from the other end of the plane floor portion up to the outer peripheral surface of the inner race,
    the clutch element includes a plane contact portion plan-contacting the element accommodation unit and a curved clamping portion facing the plane contact portion, and is disposed between the first wall portion and the second wall portion, and
    the curved clamping portion is provided to surface-contact an inner peripheral surface of the outer race in a rotational direction of the outer race to the inner race to be selectively locked or unlocked on the inner peripheral surface of the outer race.

* * * * *